Sept. 23, 1941.　　　G. E. MARTIN　　　2,256,721

HYDRAULIC BRAKE

Filed Oct. 9, 1939

Inventor
George E. Martin
By
Blackmore, Spencer & Flint
Attorneys

Patented Sept. 23, 1941

2,256,721

UNITED STATES PATENT OFFICE 2,256,721

HYDRAULIC BRAKE

George E. Martin, Detroit, Mich., assignor to General Motors Corporation, Detroit, Mich., a corporation of Delaware Application October 9, 1939, Serial No. 298,569

4 Claims. (Cl. 188—106)

This invention relates to brakes and more particularly to brakes wherein opposed shoes are spread into frictional engagement with the drum by either one or both of two applying means, one of which employs a hydraulic motor.

An object of the invention is to modify the conventional hydraulic motor in such a way that air may not be drawn into the cylinder of the motor when the shoes are spread solely by the other applying means.

Other objects and advantages will be understood from the following description.

The invention is illustrated by the accompanying drawing in which.

Figure 1:
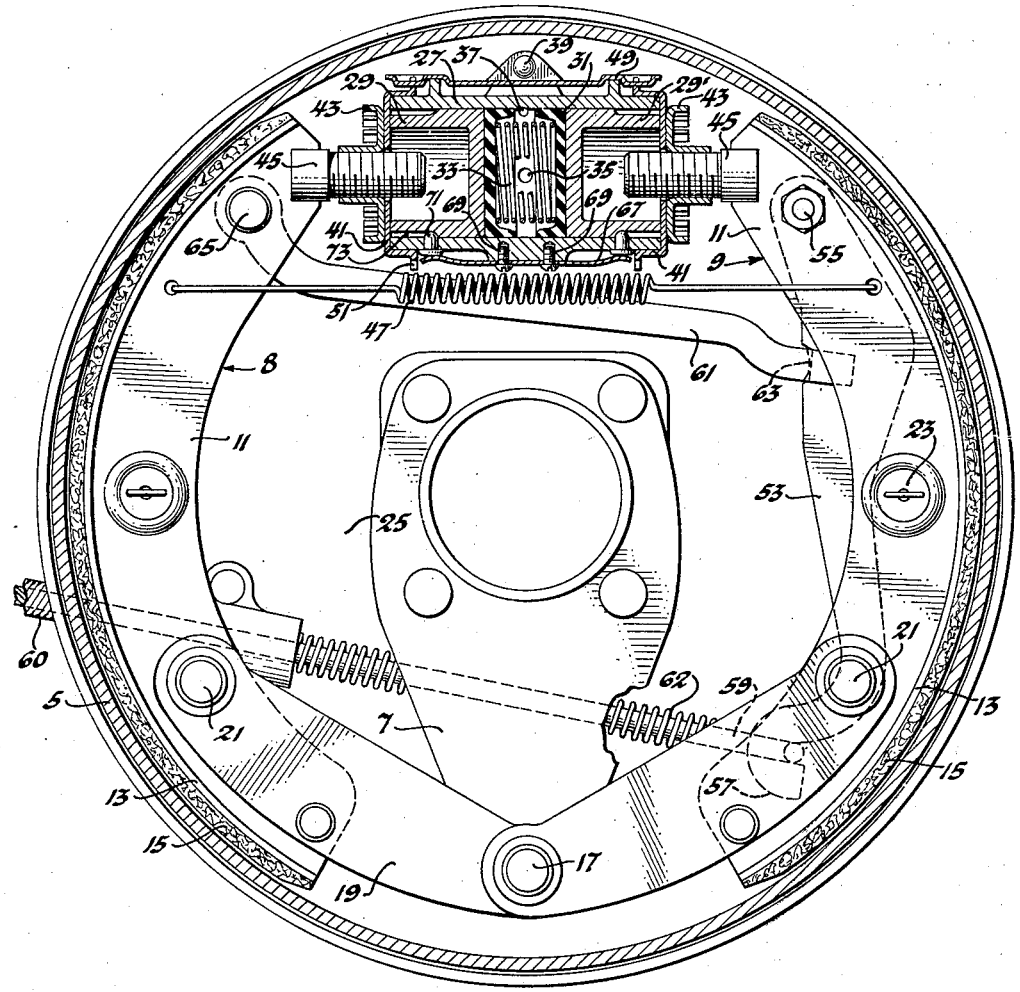
Figure 1 is a section through a brake drum and wheel cylinder showing the improvements embodied therein.

Referring to the drawing by reference characters, the brake drum is marked 5 and numeral 7 represents an anchor plate to take the brake torque. The drum is to be carried by a vehicle wheel. Shoes 8 and 9 are to be spread apart to frictionally engage the drum and retard the rotation of the wheel. Each shoe has a web 11 and a flange 13, the latter provided with frictional material 15. Each shoe transmits pressure to the anchor pin 17 carried by plate 7 through a link 19, the links being pivoted to the shoes as at 21. Numeral 23 is a diagrammatic representation of a conventional expedient for holding the shoe toward a fixed cover plate 25 and away from the rotating drum.

In motor vehicles wherein the shoes are spread by hydraulic applying means there is provided between the pair of shoe ends remote from the anchored ends, a hydraulic motor or wheel cylinder. Such a cylinder is shown at 27. In the case of four wheel brakes there will be one such cylinder for each brake. The cylinder has two pistons 29, 29' between which are seals 31. Between the seals is a spring 33 operable to hold the seals against the pistons. In the embodiment shown, the pistons are hollow cups. Fluid from a suitable master cylinder is forced into the space between the pistons through an inlet opening 35. The incoming fluid moves the pistons outwardly away from each other. To vent air from the cylinder there is an opening marked 37, the opening being normally closed by a plug not shown.

The connection between each piston and the adjacent shoe comprises a cup-shaped disk 41 adapted to engage the end of the cylinder and having an annular portion embracing and slidable on the wall of the cylinder. A notched nut 43 is secured to disk 41 and a plunger 45 is threaded to the nut and has a forked end straddling the web 11 of the shoe. A coil spring 47 is terminally secured to the shoes to determine their position of release by the engagement of disks 41 with the end walls of the cylinder. Adjustment of the released position is made by rotating the nut 43 to reciprocate the plunger 45 relative to the piston 29. To hold the parts in adjusted position a spring member 49 is secured intermediate its ends to the cylinder at 39, the ends being adapted to enter notches 51 formed in the cup 41.

With such a brake assembly it is customary, especially in the case of rear wheels, to add mechanical shoe spreading linkage operable independently of the hydraulic applying means by an emergency lever. This supplementary brake applying mechanism is available for emergency operation and for holding the car when parked.

On the drawing is shown a lever 53 pivoted to shoe 9 at 55. Lever 53 has a hooked end 57 to which is attached a suitable tension link or cable 59. This cable is to be connected with an emergency lever not shown. The cable 59 is preferably carried in a flexible housing 60. A spring 62 is used as shown to normally hold the mechanical applying means in brake release position. The applying means is completed by means of a link 61 engaging at 63 an intermediate point of lever 53 and pivoted to shoe 7 at 65. It will be seen that a pull on cable 59 operates through the lever 53 and link 61 to spread the shoes into contact with the drum. The two spreading means may obviously be used separately or together.

At this point it should be explained that when the brakes are released there is a certain residual fluid pressure within the cylinder 27 and between the pistons, the master cylinder being usually provided with a spring loaded valve for this purpose. This residual pressure obviously tends to push the pistons apart. Spring 33 supplements this residual pressure. Spring 47 is of such strength as to overcome the spreading action of the residual pressure and the spring 33. When to the potential energy of the residual pressure and the spring 33 is added the manually applied force acting through the fluid column the tension of spring 47 is overcome and the pistons move outwardly and force the shoes into frictional engagement with the drum. If, instead of the pressing pedal the operator spreads the shoes through the instrumentality of parts 53 and 61, spring 47 is no longer effective to overcome the residual pressure and the tension of spring 33. In the absence of any means to prevent it, each piston would then move outwardly and reduce the residual pressure. The reduction in pressure might be sufficient to cause a flow of air around the pistons and the seals into the space between the pistons. This is decidedly disadvantageous because the most efficient action of a hydraulic brake requires that the system be filled with a non-compressible medium. To prevent this piston movement and the entry of air, as above described, there is added, in accordance with this invention, a spring detent device which holds the pistons in their retracted position against the pressure of the residual fluid and the spring 33 when the influence of spring 47 is removed by the operation of the mechanical applying means. In Figure 1 a flat spring 67 is secured to the cylinder adjacent its middle point by screws 69. Each end of the spring engages a detent 71 which extends through the cylinder wall and is movable in a slot 73 in the piston. Normally and with the piston in its retracted position the detent is in the inner end of the slot. The pressure of spring 67 is such as to equal or slightly exceed the combined pressure of the residual fluid and the spring 33. When the brake is applied hydraulically the pressure of spring 67 is easily overcome. When the brake is applied mechanically, spring 67 holds the piston in its inner position as the shoes spread to operative position. The residual pressure remains unchanged and no air can enter the space between the pistons.

Figure 2:
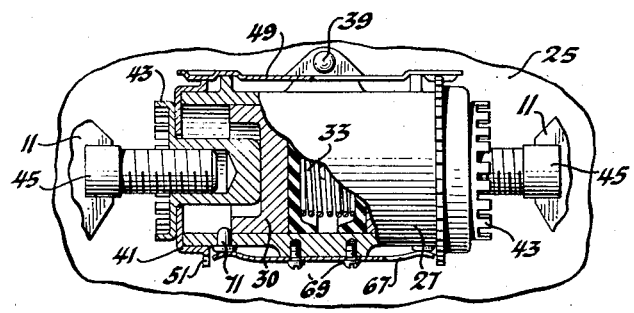
Figure 2 is an elevation partly in section of a modification.

In the modification shown by Figure 2 the piston 30 is shorter in length and the detent 71 engages the end wall of the piston instead of the inner end of a slot formed therein. The operation is the same as described in connection with Figure 1.

I claim:

1. In a brake, hydraulic applying means, mechanical applying means, said two means adapted to be operated independently, said hydraulic means including a cylinder, a piston therein subject to fluid pressure to apply the brake and subject to residual fluid pressure when the brake is released, first spring means to overcome said residual pressure and holding the brake released, a second spring in said cylinder supplementing the action of the residual pressure, and means to retain said piston from movement under the influence of said residual pressure and second spring when the mechanical applying means is operated independently and the first spring means thereby rendered inoperative to overcome said residual pressure and second spring, said last named means comprising a spring actuated detent engaging said piston.

2. In a brake, hydraulic applying means, mechanical applying means, said two means adapted to be operated independently, said hydraulic means including a cylinder, a piston therein subject to fluid pressure to apply the brake and subject to residual fluid pressure when the brake is released, first spring means to overcome said residual pressure and holding the brake released, a second spring in said cylinder supplementing the action of the residual pressure, and means to retain said piston from movement under the influence of said residual pressure and second spring when the mechanical applying means is operated independently and the first spring means thereby rendered inoperative to overcome said residual pressure and second spring, said last named means comprising a detent slidable through the wall of said cylinder, and yielding means on the outer wall of said cylinder adapted to project the detent through the cylinder wall and into the path of movement of said piston.

3. In a brake, hydraulic applying means, mechanical applying means, said two means adapted to operate independently, said hydraulic means including a cylinder, a piston therein subject to fluid pressure to apply the brake and subject to residual fluid pressure when the brake is released, spring means to overcome said residual pressure and hold the brake released, and means to retain said piston from movement under influence of said residual pressure when the mechanical applying means is operated independently and the spring means is thereby rendered inoperative to overcome said residual pressure, said last named means comprising a spring actuated detent engaging said piston.

4. In a brake, hydraulic applying means including a movable part, resilient means operable against the hydraulic applying means to release the brake, said applying means being subject to residual pressure when the brake is released, other means to apply the brake against the action of said resilient means and yieldable detent means operably engaging said movable part to hold the same from brake applying movement under the influence of said residual pressure when said other means is used to apply the brake.

GEORGE E. MARTIN.